United States Patent [19]
Crawford et al.

[11] 3,943,686
[45] Mar. 16, 1976

[54] WRAPPING MACHINE WITH SEVERING BLADE IN CRIMPING HEAD

[75] Inventors: Donald C. Crawford; Michael R. Nack, both of Green Bay, Wis.

[73] Assignee: FMC Corporation, San Jose, Calif.

[22] Filed: Sept. 5, 1974

[21] Appl. No.: 503,944

[52] U.S. Cl. ................. 53/182 R; 30/355; 83/337
[51] Int. Cl.² .......................................... B65B 9/06
[58] Field of Search ............... 53/182; 83/337, 338; 30/355

[56] References Cited
UNITED STATES PATENTS

| | | | |
|---|---|---|---|
| 3,641,857 | 2/1972 | VandeCastle | 83/337 X |
| 3,706,183 | 12/1972 | Talarico | 53/51 UX |
| 3,824,887 | 7/1974 | Marchard | 30/355 X |
| 3,828,631 | 8/1974 | Spengler et al. | 30/355 X |

*Primary Examiner*—Travis S. McGehee
*Attorney, Agent, or Firm*—C. E. Tripp

[57] ABSTRACT

An article wrapping machine has superposed shafts geared together that mount opposed rotary crimping heads for crimping the wrapping between the articles. A knife blade is radially movable in a slot in the upper crimping head and is projected into a recess in the lower crimping head for severing the wrapping between a string of articles. The blade actuating mechanism comprises a rod axially movable in a bore in the shaft that mounts the upper crimping head. A pair of bell cranks is provided for projecting and retracting the blade. An intermediate portion of each bell crank is pivoted to the crimping head. An outer or free end portion of each crank is pivoted to the blade and the inner ends are pivoted to the rod. The bell cranks are disposed so that the pivotal connections to the blade pass "over center" and the geometry of the arrangement is such that there is virtually no axial or slicing motion of the blade during its radial movement. The blade actuating rod is operated by a cam external of the machine frame which overcomes the force of a spring that is connected directly to the rod and not to the blade. A zig zag severing cut is provided without actually forming the blade as a zig zag member. This is accomplished by beveling one side of the blade and grinding notches in the flat or unbeveled side in a manner that forms specially shaped saw teeth which teeth progressively provide a zig zag severing cut.

12 Claims, 19 Drawing Figures

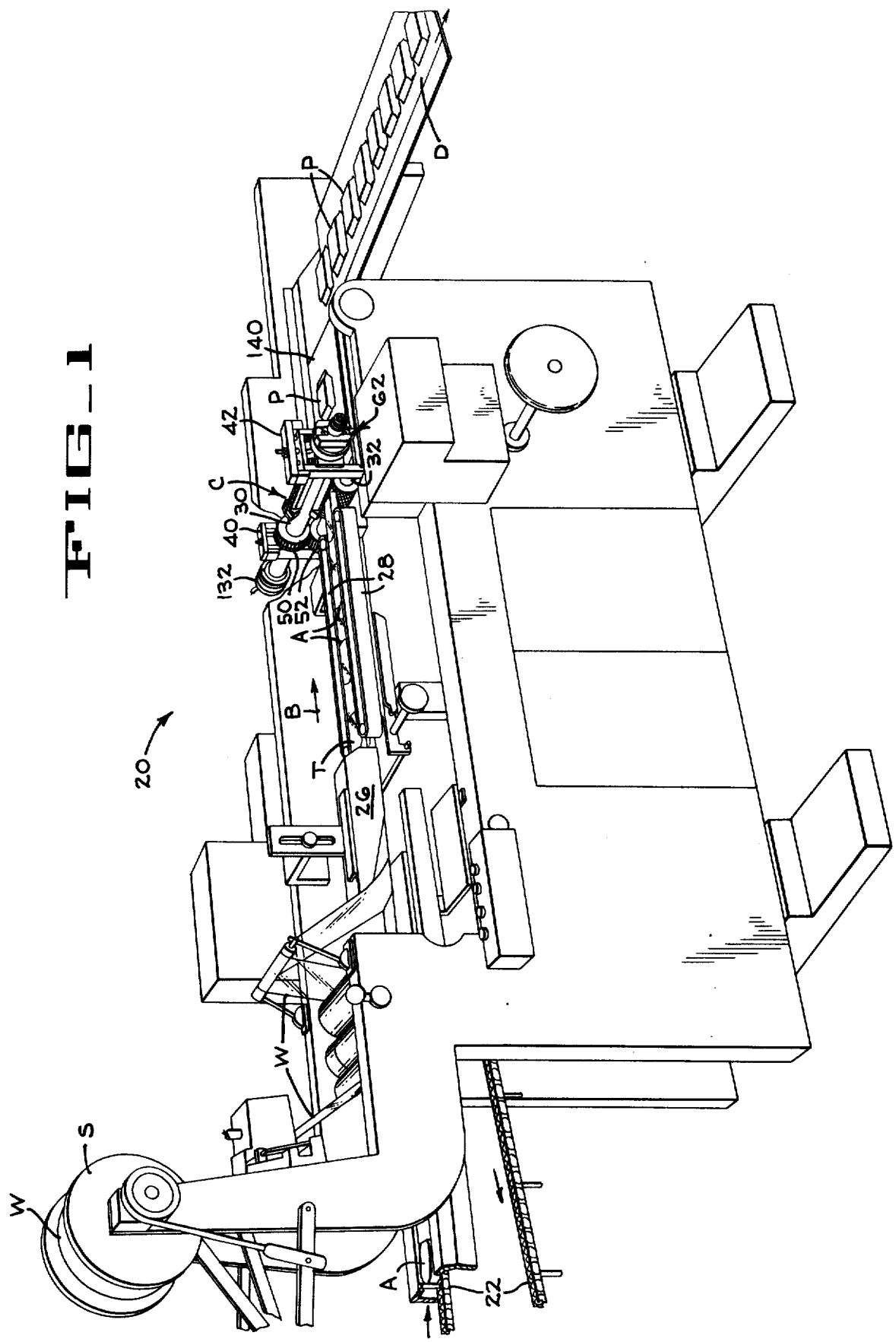

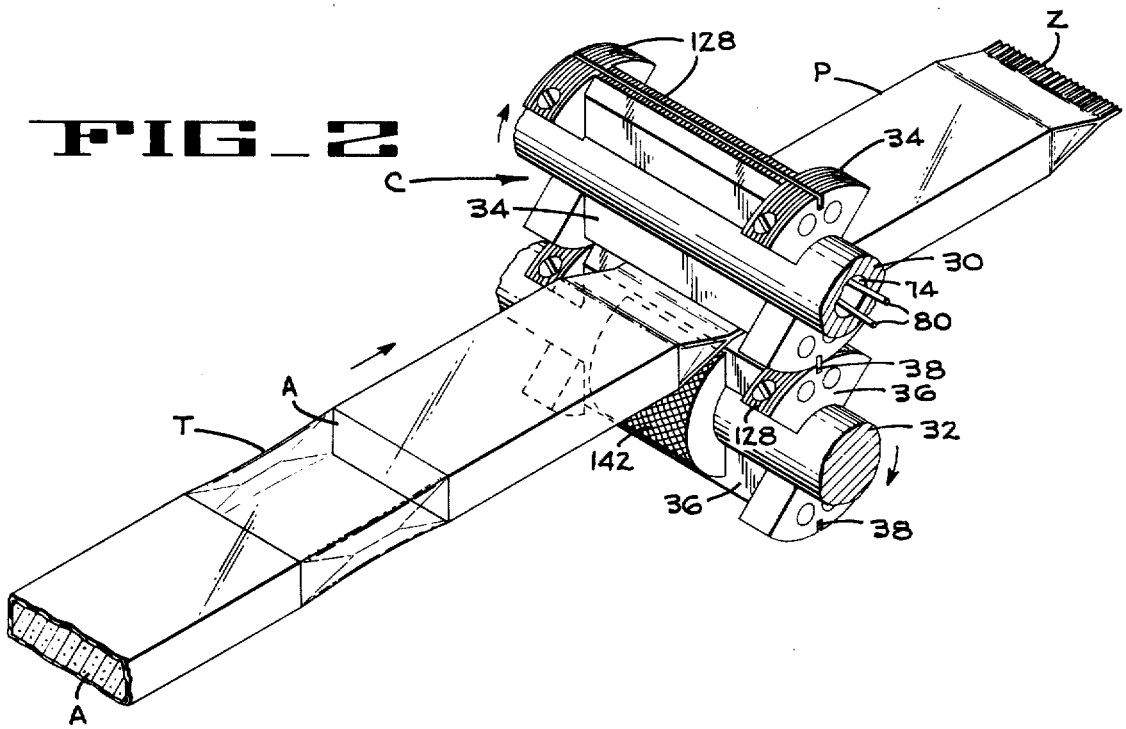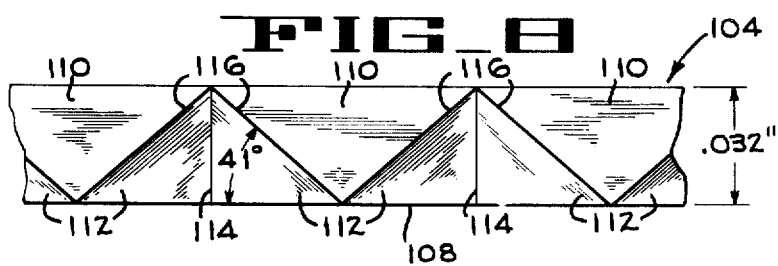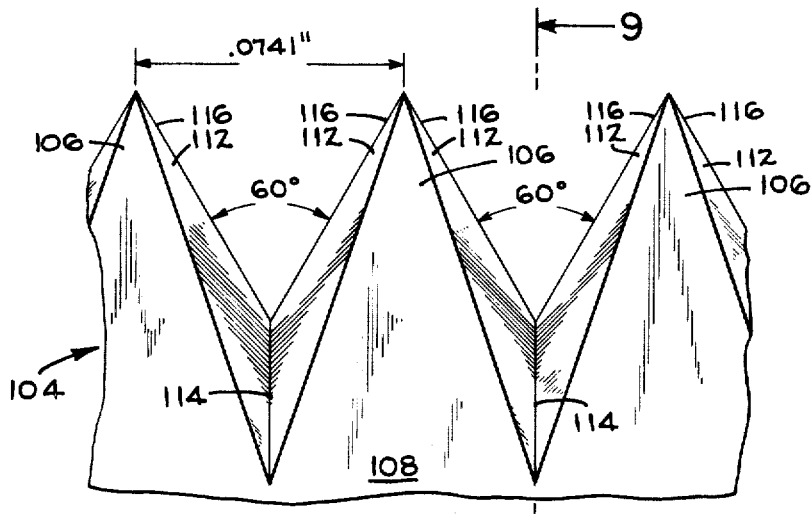

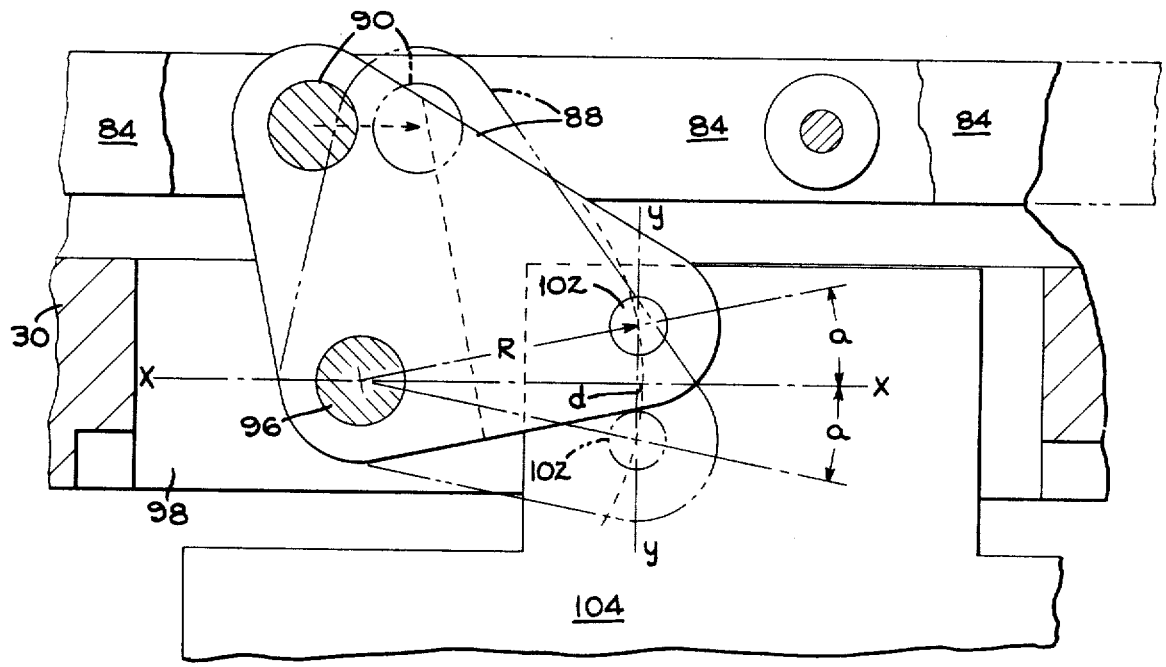
FIG_5
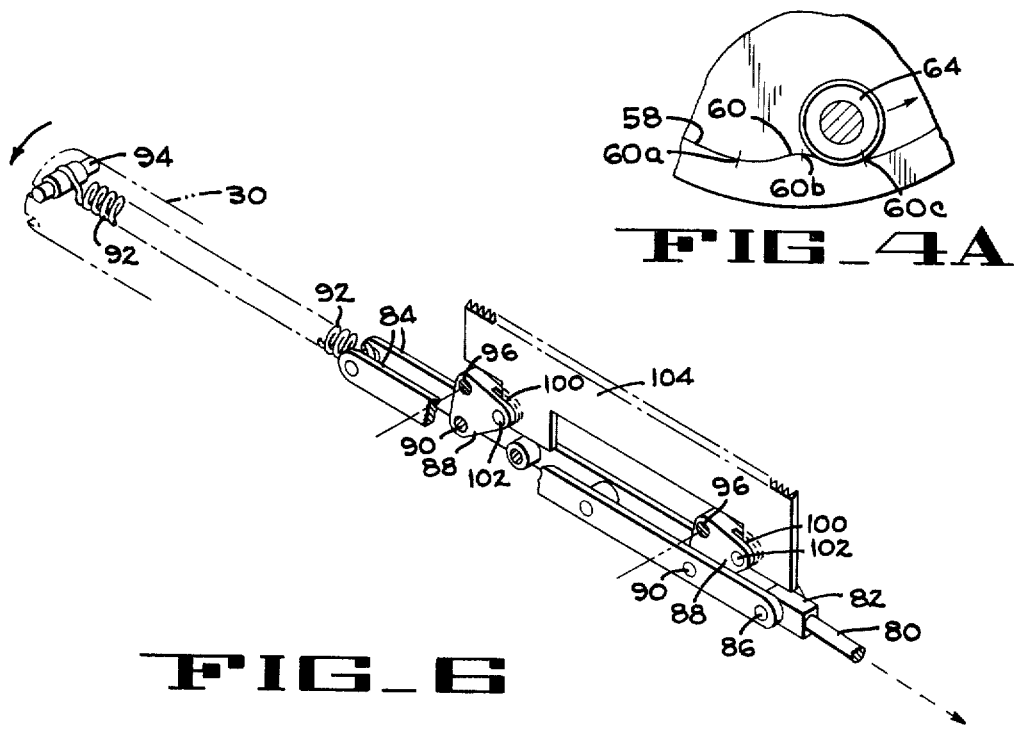
FIG_4A
FIG_6

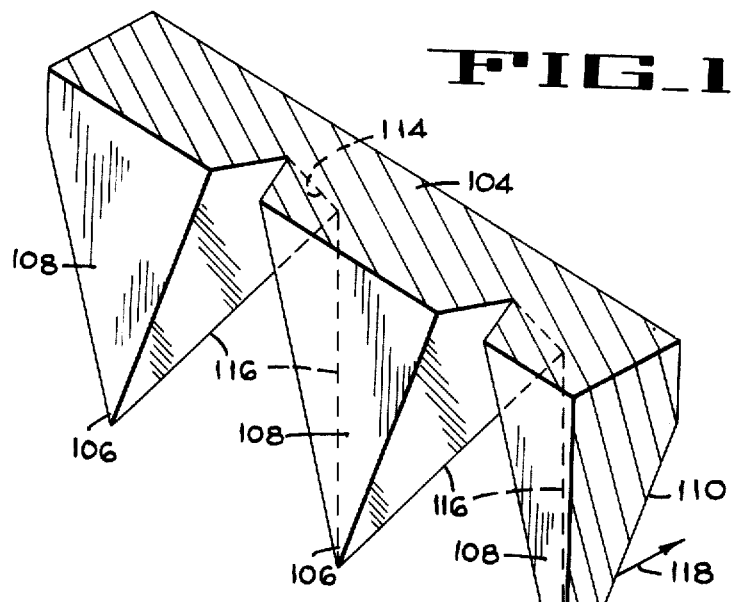
FIG_10
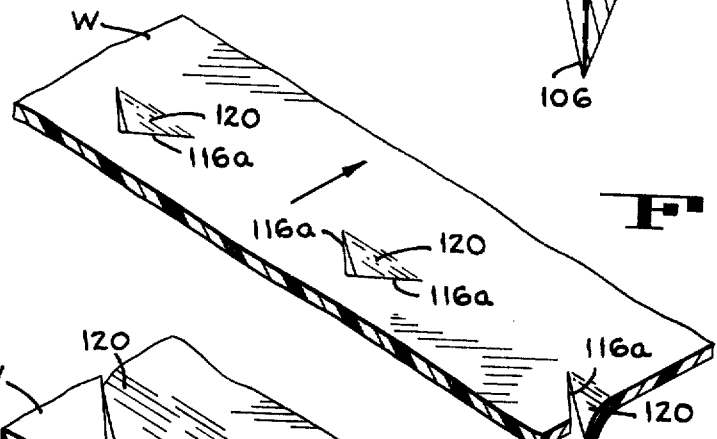
FIG_11
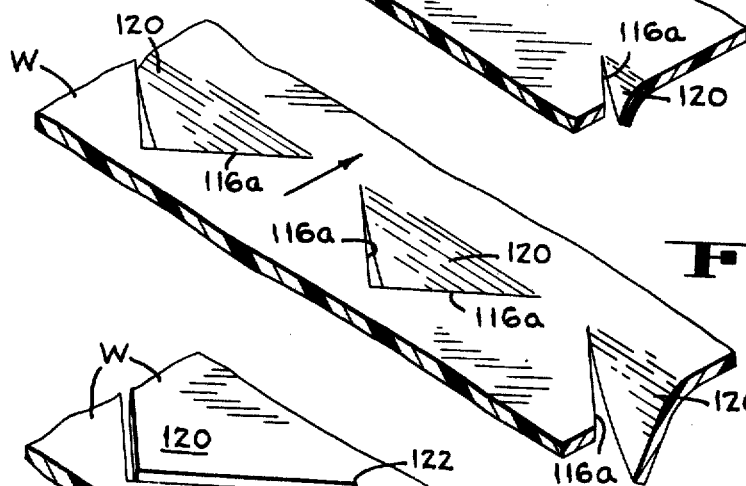
FIG_12
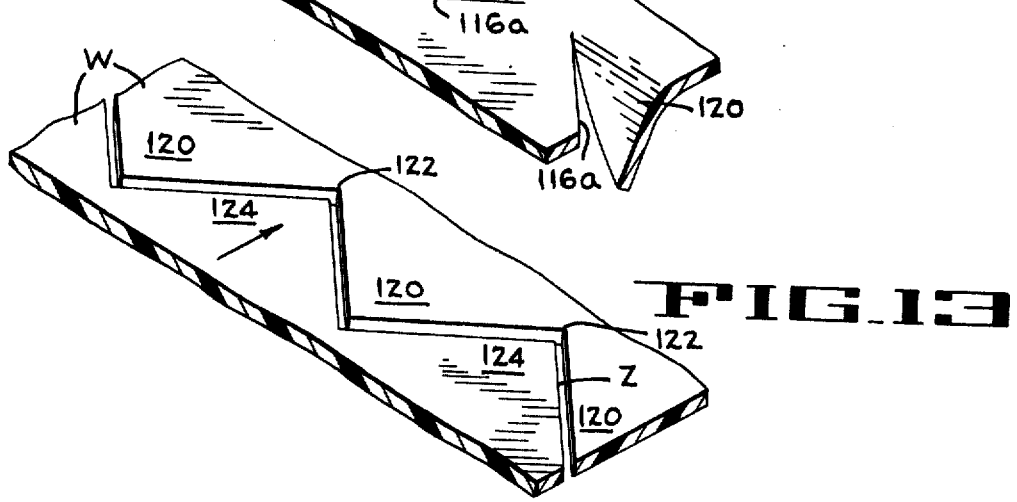
FIG_13

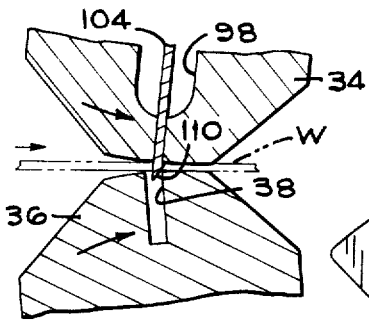
FIG_15
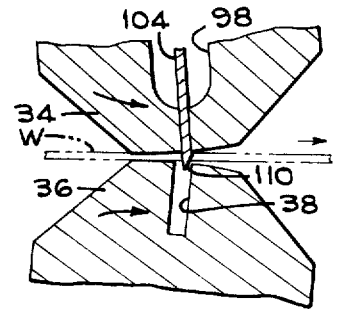
FIG_16
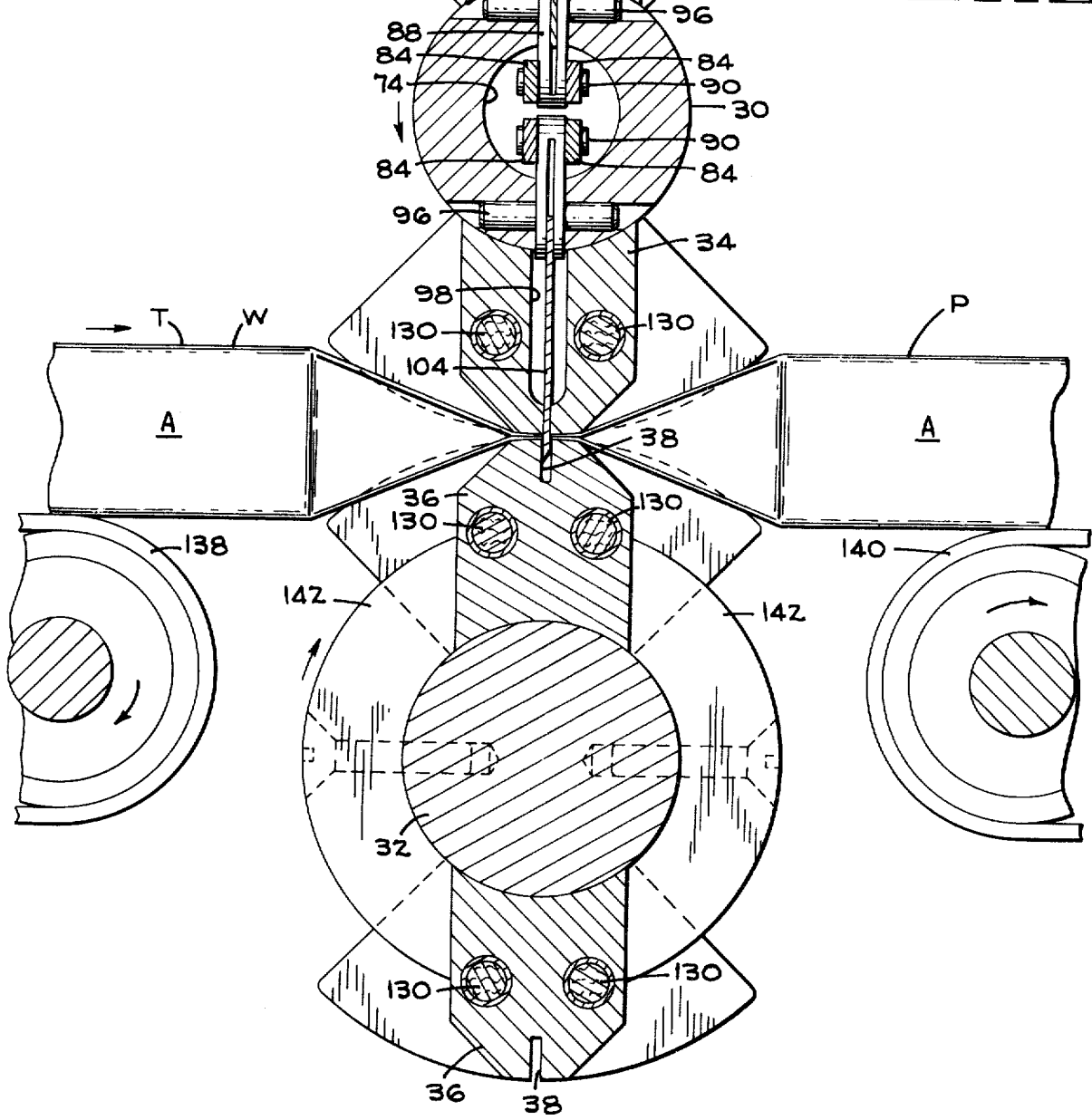
FIG_14

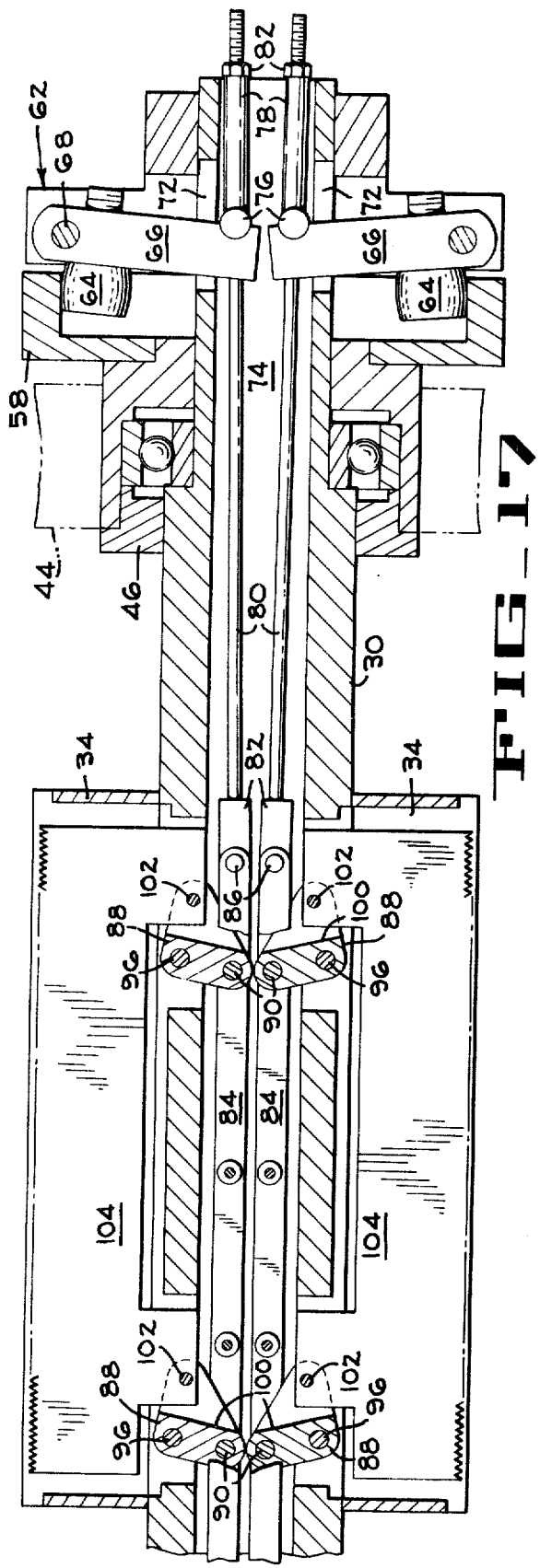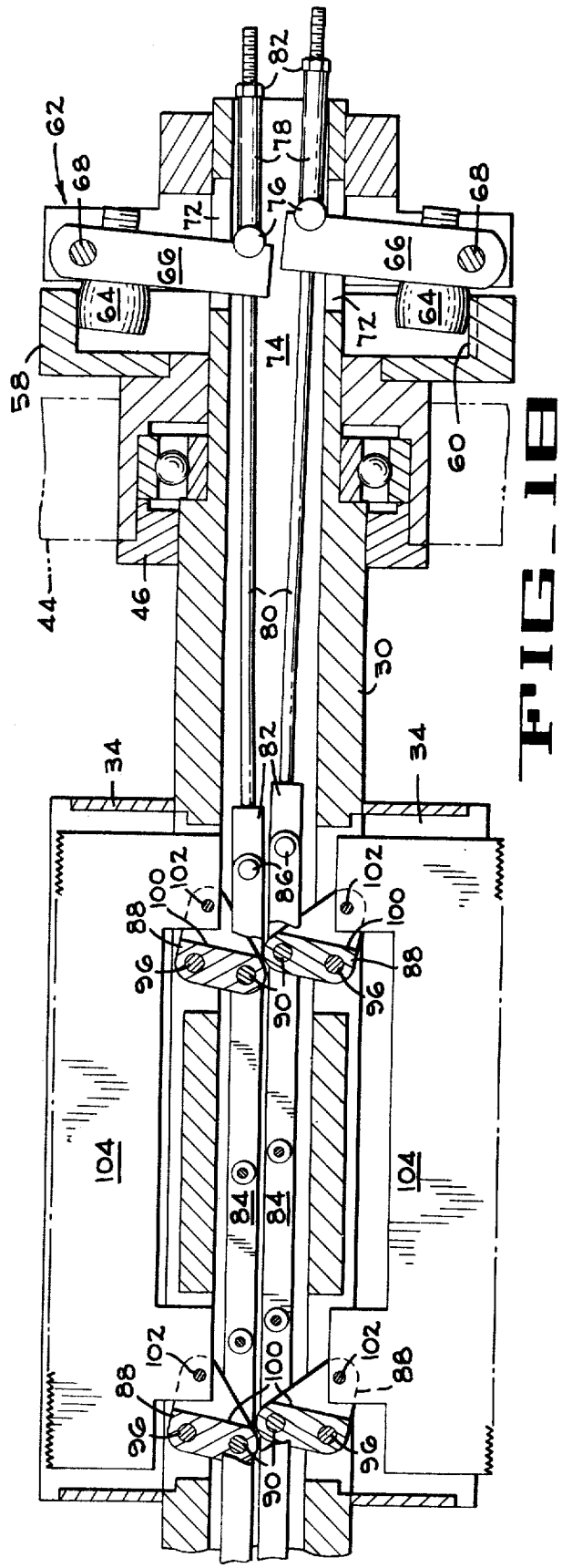

WRAPPING MACHINE WITH SEVERING BLADE IN CRIMPING HEAD

FIELD OF THE INVENTION

This invention relates to article wrapping machines and more particularly to wrapping machines of the type wherein spaced articles are entubed in a wrapping, such as cellophane or the like, the tube or web between the articles is crimped and sealed and the web is transversely severed between the articles. More specifically, the invention relates to the means for severing the web.

DESCRIPTION OF THE PRIOR ART

The U.S. patent to Teplitz 3,057,239, Oct. 9, 1962 discloses a shear for cutting moving steel strip that comprises superposed rollers, one of which carries a fixed shear blade and the other which carries a projectable shear blade. The projectable shear blade is mounted in a recess in the lower roller and has a pair of angled slots formed therein. The blade is projected by means of anti-friction pins slidable in the slots. The pins are mounted in an axially movable frame that is connected to a rod slidable in a bore in the shaft for the lower roller. The shaft is advanced and retracted by a blade actuating fluid cylinder that is mounted externally of the gears that gear the rollers together. Actuation of the blade is controlled by a pair of cams operating in conjunction with a relay circuit and a solenoid valve.

Vreeland et al U.S. Pat. No. 3,212,229, Oct. 19, 1965, shows superposed rollers having pivotally mounted tube sealing shoes with the shoes in the upper roller having radially projectable cutoff knives. The knives are projected by a pair of fixed cams mounted on a non-rotatable shaft that forms the hub of the rollers.

Bate U.S. Pat. No. 3,415,704, Dec. 10, 1968, discloses superposed rotary heat sealing crimpers with a spring retracted, cam ejected blade slidably mounted in the upper crimper. The blade is actuated by a rotary cam that, in effect, engages a rearwardly projecting end of the blade directly.

Zimmerman U.S. Pat. No. 3,524,301, Aug. 18, 1970, discloses a cut-off knife for a packaging machine wherein a blade in the upper crimping head partakes of a combined radial and slicing (axial) motion. The blade is connected between an operating link and a follower link and is advanced by a trip mechanism disposed inside of the frame of the machine that acts only on the operating link. The blade is biased at one end by a coil spring towards its retracted position and is projected with a slicing motion by the trip mechanism against the force of the spring. The spring force acts directly on the pivots that connect the blade to the operating and follower links.

The rotary cutting head of Vande Castle U.S. Pat. No. 3,641,857, Feb. 15, 1972, has some points of similarity with that of Zimmerman patent in that the blade is projected with a slicing motion. In the Vande Castle patent, the blade is progressively retracted by a cam that is disposed inside the frame of the machine, which cam retracts the blade against the force of a spring. The blade operating linkage connects directly to the blade which is mounted on a pair of links, one of which is a follower link. At the proper time the cam quickly releases the blade which is quickly advanced with a slicing motion by the compressed blade advancing spring, acting directly on the blade.

The tube sealing and separating apparatus of British patent 1,072,287, June 14, 1967, is of the type wherein the crimping heads are given a translatory motion by being mounted on a bar supported by paired wheels. A severing knife is projected when the associated sealing head carries a roller on the blade across the ramp of a fixed cam.

SUMMARY OF THE INVENTION

Briefly, the article wrapping machine of the present invention is of the type having a frame, superposed shafts geared together and mounting opposed rotary crimping heads for crimping the wrapping between a string of entubed articles. The upper crimping head is slotted and mounts a radially movable knife blade. The lower crimping head is formed with a blade receiving recess. The blade actuating mechanism comprises a pair of axially spaced links pivoted to the associated crimping head at the radially inner portion of its slot. The free or outer end of each link connects to the blade and the shaft that mounts the associated crimping head has an axial bore therein. The blade actuating mechanism comprises a rod movable axially in the shaft bore and the rod is pivotally connected to the inner end of each of the aforesaid links. A cam follower is mounted on the crimping head shaft outside of the frame and the bearings that mount the shaft. A stationary cam is mounted on the frame for actuating the cam follower.

The blade is formed in a manner which provides a zig zag cut through the wrapping when the blade enters the recess in the opposed crimping head. Although the blade forms zig zag cuts it is not actually made in the conventional zig zag configuration. The conventional zig zag configuration is difficult to sharpen and expensive to manufacture and usually requires the opposition of an anvil for pressure cutting instead of a simple recess for punch cutting as in the present invention. The geometry of the blade operating linkage just described is such that the blade is projected substantially radially with very little axial motion so that a punch type zig zag cut can be performed as described.

FEATURES OF THE INVENTION

The following significant features of the machine of the invention will be summarized:

1. Although the severing blade produces a zig zag severing cut which type of cut is in demand for packages that are wrapped in material that is difficult to tear such as cellophane, etc., the blade itself need not be in a conventional zig zag formation and need not provide a pressure cut against a solid anvil. The zig zag cut of the blade of this invention is produced simply by beveling the blade from one side and by grinding notches from the flat or opposite side of the blade in a certain manner so that the blade progressively pierces the wrapping and provides a zig zag severing cut.

2. In order to provide the aforesaid zig zag cut it is essential that the blade have very little axial or slicing motion when it is being projected into the recess formed in the opposed crimping head. According to the present invention, the blade is pivotally supported on a pair of links and the link motion is geometrically arranged so that during the range of operation of the blade, the outer ends of the links which are connected to the blade partake of an "over center" motion. The result of this geometrical arrangement of the links is such that the blade motion is essentially radial. Any axial or slicing motion of the blade is substantially insignificant and is much less than the pitch of adjacent teeth of the blade itself that produces the zig zag cut.

3. The blade actuating links referred to above are both connected to a rod that moves axially in a bore formed in the shaft of the crimper head that carries the blade. Since both links are positively driven, (there being no follower link) the aforesaid "over center" action of the links is made possible.

4. In the form of the invention wherein the blades are cammed outwardly against the force of a retracting spring, the retracting spring is connected to the blade actuating rod and is not connected directly to the blade itself. This construction minimizes the wear in the blade actuating links because all of the force of the retracting spring is transmitted by the rod directly to the cam that actuates the rod without being assumed by any of the pivots of the links themselves either at the blade or elsewhere.

5. The cam that operates the aforesaid rod, which in turn slides in the hollow shaft in the crimping head that mounts the blade, is placed externally of the frame and of the gears that gear the two crimping heads together and externally of the bearings. This places the cam and associated cam followers in an area which is easily accessible for lubrication and adjustments, as opposed to prior constructions wherein the trip or cam mechanisms for operating the blades are disposed inside the side of the side frame plates and bearings.

6. The connection between the blade operating rod and associated cam follower is readily adjustable to provide for precise positioning of the blade in the slot in its crimping head.

7. The cam follower for actuating the aforesaid rod is in continuous rolling contact with the cam and there is no impact motion, as is the case with trip mechanisms of the prior devices.

8. The cam follower and blade actuating mechanism in addition to being smooth in its action can be designed so that the knife is projected and retracted through a relatively small angular rotation of the shaft mounting the crimping head associated with the knife.

9. The internal rod actuation mechanism wherein the blade actuating rod is dispersed within a bore in the associated shaft lends itself to a construction wherein each shaft mounts a pair of diametrically opposed crimping heads, there being two actuating rods in the shaft that mounts the bladed crimping head. Both rods are actuated by the same cam.

The manner in which these and other features and advantages of the present invention can be attained will be apparent from the following detailed description.

BRIEF DESCRIPTION OF THE DRAWINGS

FIG. 1 is a perspective of a known type of wrapping machine incorporating the rotary head of the present invention.

FIG. 2 is a diagrammatic perspective illustrating the rotary head of the present invention and its general mode of operation upon a tubular web enclosing spaced articles.

FIG. 4A is an enlarged fragmentary schematic elevation of a portion of a face cam shown in FIG. 3.

FIG. 5 is an enlarged fragmentary section of the area indicated by the arrow 5 on FIG. 3. approximating FIG. 6 is a schematic fragmentary perspective of a portion of the apparatus shown in FIG. 3.

FIG. 7 is an enlarged fragmentary elevation of the saw tooth edge of a cutting blade shown at the arrow 7 on FIG. 3, but is viewed from the reverse side thereof.

FIG. 8 is a plan of the blade shown in FIG. 7.

FIG. 9 is a section taken along lines 9 — 9 on FIG. 7.

FIG. 10 is an enlarged perpsective of the area indicated by the arrow 10 on FIG. 3, and illustrates the working edge of the saw tooth cutting edge of the FIG. 7 knife blade and its orientation for severing the web.

FIGS. 11, 12 and 13 are fragmentary perspective schematic views illustrating the web between adjacent packages and the progressive cutting action effected by the FIG. 8 cutting edge for transversely severing the web.

FIG. 14 is a vertical enlarged section taken substantially along lines 14 — 14 on FIG. 3.

FIGS. 15 and 16 are enlarged fragmentary sections of the central portion of FIG. 14, respectively illustrating operating positions before and after the position shown in FIG. 14.

FIGS. 17 and 18 are enlarged fragmentary sections similar to FIG. 3, showing sucessive operational positions.

DESCRIPTION OF THE PREFERRED EMBODIMENT

Figure 4:
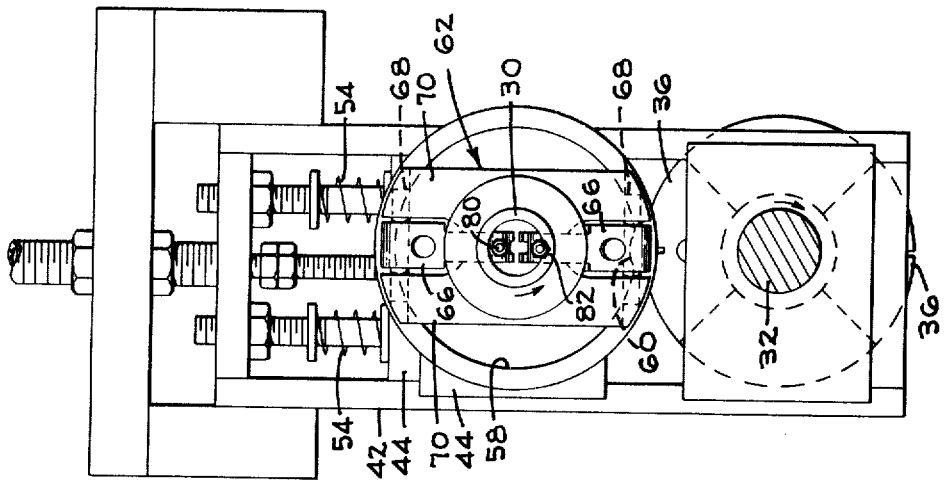
FIG. 4 is an end elevation of the apparatus shown in FIG. 3.

FIG. 1 illustrates a wrapping machine 20, an earlier form of which is disclosed in U.S. Pat. No. 2,546,721. The general operating principles of the wrapping machine 20 are as follows: A pusher type of input conveyor 22 is provided with an upper reach that propels a single file of spaced articles A in the direction of the arrow B through the wrapping machine 20. A spool 23 of plastic web material W is mounted at the input end of the machine, and the web is trained through a forming shoe 26 which curls the web downwardly around the articles A to form a tube T at the downstream end of the forming shoe. The margins of the web are sealed, by means not shown, under the tube T, and the tube is advanced by means including lateral gripping belts 28 through a crimping, sealing and severing head C which forms the subject matter of the present invention.

The head C (FIG. 2) is hereinafter referred to as a crimping head, and includes upper and lower crimping head shafts 30 and 32 that are positioned above and below the tube T and synchronously counter rotate. The crimping head shafts 30 and 32 are respectively provided with heated crimping jaws 34 and 36 which transversely heat seal the web between adjacent articles A. The upper crimping jaw 34 is provided with internal cutting blades (not shown in FIG. 1) that are cooperatively received within longitudinal grooves 38 in the lower crimping jaws 36 to transversely sever the web intermediate adjacent articles. The thus produced individual packages P (FIG. 1) are then fed onto a discharge conveyor D for delivery into cartons or the like further downstream station.

The crimping head shafts 30 and 32 (FIGS. 1 and 3) are conventionally supported by spaced slide frames 40 and 42, each of which slidably mounts a vertically movable bearing support block 44 for bearings 46 that rotatably mount the crimping head shaft 30. The lower crimping head shaft 32 is provided with bearing support blocks 48 that are also mounted in the slide frames 40 and 42. Intermeshed gears 50 and 52 on the upper and lower shafts 30 and 32, respectively, rotate the crimping jaws 34 and 36 in timed relation to each other and to the motion of the web W.

In known manner, the support blocks 44 (FIGS. 3 and 4) are biased downward by springs 54 (as shown for only one slide block 44, FIG. 4) which allow upward displacement of the upper crimping head shaft 30 if a mistimed article should happen to be positioned between the crimping jaws 34 and 36 when they close together. The present invention resides primarily in the internal parts at 56 (FIG. 3) which are contained within crimping head shaft 30 and the crimping jaws 34.

The upper crimping head shaft 30 (FIG. 3) projects through the slide frame 42 and through a fixed face cam 58. The major portion of the face cam 58 is circular, and the cam is provided with an inwardly directed lobe 60 that lies in vertical alignment with the axis of the upper crimping head shaft 30. As later described, the angular extent of the lobe 60 approximates 15 degrees. A cam follower assembly 62 (FIG. 3) is secured to the outer end portion of the crimping shaft 30, and includes follower rollers 64 which are biased outward into rolling engagement with the face cam.

At this point it should be noted that the operating components associated with each of the cam follower rollers 64 are symmetrically arranged about the axis of the crimping head shaft 30, and accordingly, the same reference numerals are used interchangeably for those parts. Considering now the upper cam follower roller 64 in FIG. 3, the roller is attached to a pivot arm 66 that is mounted on a pivot pin 68. The pin 68 is held in spaced ears 70 (FIG. 4) of the cam follower assembly 62. The other end of the pivot arm 66 projects inward through a slot 72 in the crimping head shaft 30 and operates within the hollow bore 74 of said shaft. (Also see FIG. 14)

Figure 3:
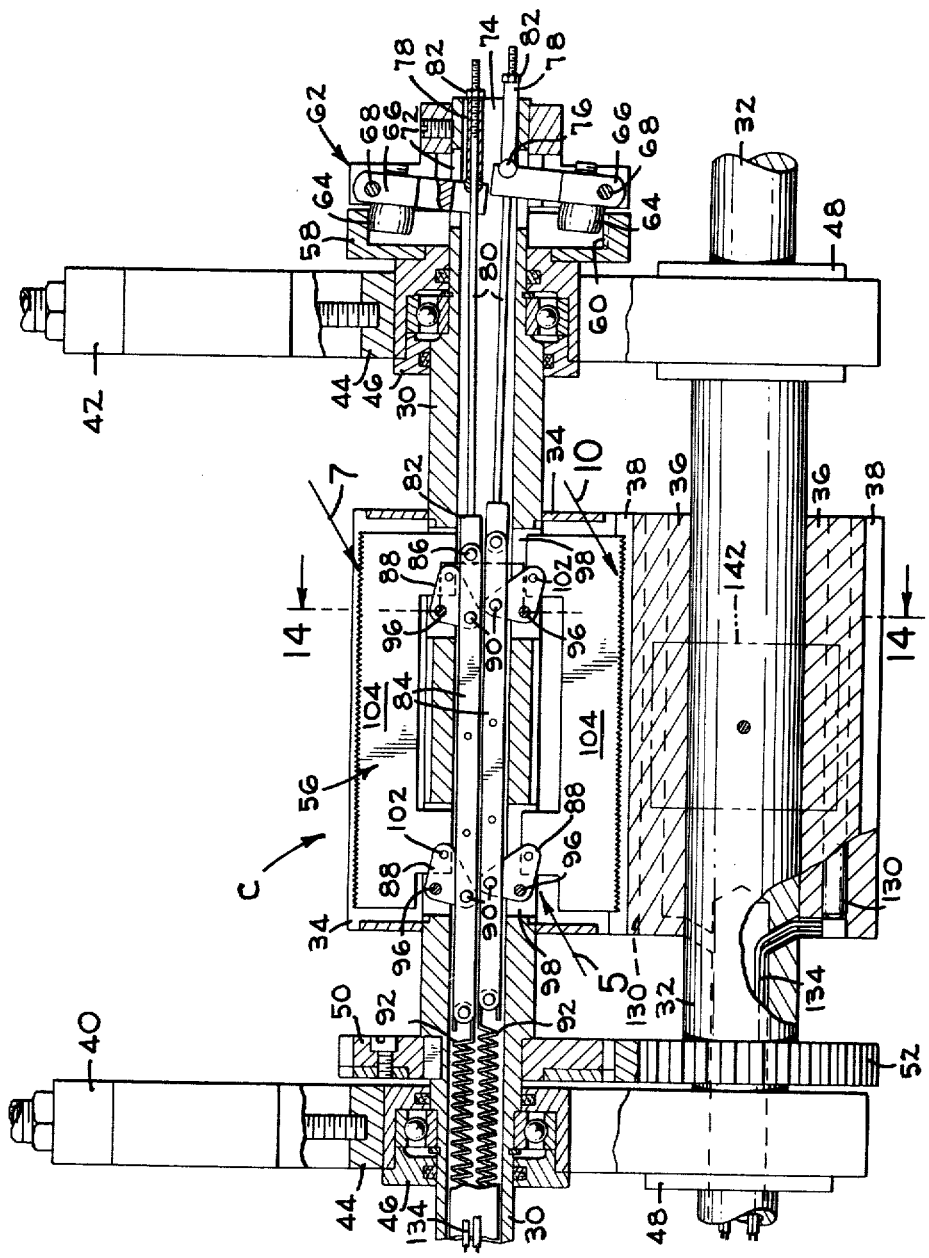
FIG. 3 is a vertical transverse section, partly in elevation, through the rotary head.

The inner end of the pivot arm 66 (FIG. 3) is forked, and is provided with arcuate recesses that receive a cross head 76. The cross head 76 is part of a T-shaped connector link 78 having a hollow threaded shank through which passes a tension rod 80. The outer end of the tension rod 80 is threaded, and a nut 82 which bears against the shank provides means for axially adjusting the tension rod relative to the connector link 78. The other end of the tension rod 80 (FIG. 6) is secured to an apertured head 82 which is in turn pivotally connected by a pivot pin 86 to a pair of tension links 84 (only the near link is shown in FIG. 3). A pair of spaced bell cranks 88, later described in detail, are pivoted to the tension links 84 by pivot pin 90. The tension links or rods 84 are anchored to the adjacent end of a tension spring 92 that biases the cam follower roller 64 into engagement with the face cam 58. The other end of the spring 92 is anchored to shaft 30.

As best shown in FIGS. 5 and 6, the intermediate portion of each bell crank lever 88 is provided with a fixed pivot stud 96 which is mounted in the wall of the hollow upper crimping head shaft 30 and spans an axial slot 98 in said shaft which provides operating clearance for the bell crank. A bifurcated outer end 100 (FIG. 6) of each bell crank 88 is connected by a pivot pin 102 to a knife blade 104. As mentioned, the inner end of each bell crank is pivoted at 90 to the rod 84. As thus far described, it will be evident that the cam follower rollers 64 (FIG. 3) will alternately move radially inward toward the axis of the crimping head shaft 30 as they move over the cam lobe 60. As a follower roller moves inward, the tension rod 80 is moved toward the open end of the crimping head shaft, thus pulling the tension links or rods 84 to the right as viewed in FIG. 3 and FIG. 6.

As shown in FIG. 4A, which is a fragmentary enlargement of the lower sector of the cam 58, the lobe 60 has an angular extent of approximately 15°. Thus, when the lower follower roller 64 (FIG. 3) is at the midpoint of the rise at 60a, (FIG. 4A) the tension links 84 (FIG. 3) are pulled toward the right, and the lower knife blade 104 is moved radially outward toward the slot 38 of the lower crimping jaw 36. At the midpoint 60b (FIG. 4A) of the lobe 60, the tension links 84 have moved to their extreme righthand position in FIG. 3, and at position 60c the tension links are returning under the force of their associated springs to their inner position which corresponds to that shown for the upper links 84 in FIG. 3. Thus, when the follower roller 64 (FIG. 4A) is at midpoint 60b, the lower knife blade 104 is fully projected into the slot 38, and at point 60c the blade is being retracted into the crimping jaw 34.

A feature of the invention resides in the fact that the springs 92 are connected directly to the actuating rods and that the cam followers pull directly on the rods. This relieves the bell crank pivots of spring loading forces and lengthens the wear life of the pivots. FIG. 5 is an enlarged operational view showing the lower lefthand bell crank 88 which appears in FIG. 3, and illustrates how the geometry of the blade mounting bell cranks 88 causes the knife blade 104 to move radially without any substantial axial motion. In FIG. 5, an axial reference line $x - x$ has been drawn through the axis of the pivot 96 between the bell crank 88 and the crimping head shaft 30. When the blade 104 is retracted (as shown in solid lines in FIG. 5), the axis of the pivot 102 between each bell crank and the blade is disposed radially inwardly of the axial reference line $x - x$. When the blade is extended (as shown by the phantom outline bell crank 88 in FIG. 5), the point of the connection 102 between each bell crank and the blade is disposed radially outwardly of the reference $x - x$ line by substantially the same distance.

In the embodiment of the invention being described, the radius "R" from the pivot 96 of the bell crank to the blade pivot 102 is 0.625 inches (⅝ of an inch). The angle "a" which forms half of the total angular displacement of the bell crank during operation is about 11° 30'. Calculation will show that the small distance "d," which represents the maximum deviation of the blade from a true radial line of motion $y - y$, is about 0.0125 inches, which is less than 1/64 inches. In the preferred embodiment of the invention, the blades have teeth pitched so that there is about 12 to 16 teeth per inch. A blade that has 12 teeth per inch will have a tooth spacing of 0.0833 inches whereas a blade having 16 teeth per inch will have a tooth spacing of 0.0625 inches.

In either case, the extent of the small deviation "d" of 0.0125 inches is but a small fraction of the pitch of adjacent blade teeth. Thus a blade having this small deviation "d" provides a later described zig zag cut which cannot be distinguished from a cut made with the same blade if the blade were moved in a purely radial direction, such as along the axis $y - y$. This geometry of the bell crank linkage for mounting the blades, wherein the pivot point between the bell crank and the blade goes from one side to the other side of a reference line $x - x$ that represents the mid-position of the blade, is referred to in the appended claims as an "over center" mounting or action of the bell crank mechanism.

The outer edges of the knife blades 104 (FIG. 3) are provided with teeth of special configuration which produce a zig zag transverse severance of the tube T along a line at Z (FIG. 2) when each blade is radially projected outward from the upper crimping head shaft 30 as above described. The tooth configuration is detailed in FIGS. 7 – 9, reference to which is now made. At the outset it should be noted that the tooth profile shown in FIG. 7 is oriented such that the individual teeth 106 are viewed from the reverse side of the upper knife blade 104 shown in FIG. 3. Thus, the near surface 108 of the FIG. 7 knife blade is flat, and the opposite side of the blade is provided with a beveled surface 110 which is 63° 10' from a line perpendicular to the flat surface 108. The flat surface 108 is relieved between the teeth by ground relief surfaces 112 which merge at a line 114 which is 53° 35' from a line normal to the surface 108. By this construction, the blade 104 is provided with cutting edges at 116 where the relief surfaces 112 meet the beveled surface 110. Thus, the cutting edges 116 are angularly related to the flat surface 108, and because the general plane of the blade 104 is normal to the web W as shown in FIG. 14, the cutting edges 116 incline from a vertical line intersecting the web W.

As seen in FIG. 7, the cutting edges 116 form a sawtooth cutting edge, and as seen in the edge view of FIG. 8 the cutting edges 116 form a zig zag cutting edge that extends between the two sides of the blade.

As shown in FIG. 8, the thickness of the blade is 0.032 inches. The teeth 106, FIG. 7, (for a blade having 14 teeth per inch) are spaced 0.0741 inches apart. The teeth are initially formed in flat blade stock with an included angle of 60° between teeth, following which the beveled surface 110 is ground into the blade. The flat side 108 of the blade is then ground with the relief surfaces 112 so that the root line 114 of the merging relief surfaces inclines the previously stated 53° 35' from a perpendicular to the flat side 108 of the blade. As shown in FIG. 8, this provides an included angle between each relief surface 112 and the flat side 108 of 41°.

It is again noted that the cutting edges of the knife blade 104 are those edges 116 where the beveled surface 110 merges with the relief surfaces 112, and that the blade 104 moves radially of the crimping shaft 30 with the flat side 108 normal to the general plane of the web W. It will be seen therefore, with reference to FIG. 9, that the sharpened edge 116 is angularly related to the plane of the web since the blade moves toward the web with the flat surface 108 perpendicular thereto.

The cutting action effected by the knife blade 104 is best understood with reference to FIGS. 10 – 13. As previously mentioned, the beveled surface 110 is the leading surface and advances in the direction of the arrow 118, said direction of course being the same direction indicated by the arrow B on FIG. 1 for the movement of the entubed articles. Thus, the near surfaces of the teeth 106 (FIG. 10) are formed by the flat side 108 of the blade on the upstream side, and the cutting edges 116 lie in the plane of the bevel 110. As the blade 104 descends against the web W (FIG. 11) the pointed ends of the teeth 106 puncture the web and the thus-severed triangular tabs 120 are pushed downward. It will be noted that the cutting edges 116 (FIG. 10) produce the severance lines 116a (FIG. 11) which define the merging sides of the tabs 120. According, as the blade 104 (FIG. 10) further descends, the severance lines 116a (FIG. 12) are further elongated, and the resultant tabs 120 are enlarged. When the knife blade 104 (FIG. 10) has completed a full downward stroke, the severance lines 116a (FIG. 13) merge together at a point 122, which point corresponds to the intersection of two adjacent cut edges 116a.

The web W is thus completely severed at this stage, and adjacent tabs 120 due to the described cutting action, form complimentary tabs 124 on the leading upstream adjacent portion of the web W, and the severance line produces the zig zag severance cut Z (FIG. 2). It will be understood that, in the interest of clarity, the crimped portions of the web have been omitted from FIGS. 11 – 13. The crimping operation is conventional and is produced by the circumferential ribs at 128 and 130 (FIG. 2) on the upper and lower crimping jaws 34 and 36. In similarly conventional manner the sealing jaws are heated by cartridge type electrical heaters 130, FIG. 14, the electrical leads of which are brought through the hollow upper crimping shaft 30 (FIG. 1) to a slip ring assembly 132. The adjacent portion of the lower crimping shaft 32 (FIG. 3) is similarly hollow to carry conductor wires 134 from the cartridge heater 130 to another slip ring assembly, not shown. Further conventional apparatus, the details of which are not critical to the present invention, are shown in FIG. 14 wherein it will be observed that the discharge end of a feed conveyor 138 and the input end of a discharge conveyor 140 are spaced apart to clear the lower crimping jaws 36. In order to provide support for the entubed articles A immediate the conveyors 138 and 140, the lower crimping head shaft 32 is provided with two diametrically opposite arcuate spacer blocks 142, the outer surfaces of which support the entubed articles when the crimping jaws 36 are displaced 90° from their position shown in FIG. 14.

It was previously mentioned that the total angular extent of the cam lobe 60 (FIG. 4A) approximates 15°. FIGS. 15 and 16 illustrate the advantages of the particular knife construction herein detailed which allow entry and exit of the knife blade 104 into the slot 38 in the lower gripping jaw 36 within the approximately 7½° of angular movement at each side of the position shown in FIG. 14 for the crimping jaws 34 and 36. Referring to FIG. 15 when the upper and lower gripping jaws 34 and 36 approach vertical alignment, the beveled edge 110 of the knife blade 104 closely clears the leading outer edge surface of the slot 38, whereas if the knife blade 104 has a square bottom edge profile it would have to be retarded so as to enter the slot 38 at a position more approximately vertical alignment of the gripping jaws 34 and 36. As an indication of the small knife blade clearance required, in the particular embodiment disclosed wherein the knife blade 104 is 0.032 of an inch thick, the slot 38 in the lower gripping jaw 36 is approximately 0.047 of an inch wide, leaving a total clearance of only 0.015 of an inch. The beveled edge 110 (FIG. 16) of the knife blade 104 also provides for early retraction of the knife blade (at about 7½° beyond the high part of the cam lobe 60) since the leading beveled surface 110 provides the necessary operating clearance beyond the position in which the gripping jaws 34 and 36 are vertically aligned.

With reference to FIGS. 17 and 18 which respectively illustrate successive operational stages in the actuation of the knife blades 104, the uppermost knife blade 104 (FIG. 17) and the lowermost knife blade 104 are illustrated in retracted positions within the gripping jaws 34. It is evident, therefore, that neither cam follower 64 is aligned with the cam lobe 60, whereby the inner ends of the pivot arms 66 are at their closest spacings from the knife blades 104. Accordingly, the bell cranks 88 have been pivoted about their respective fixed pivot pins 96 by axial motion of the tension links 84 so that the pivot pins 102 which connect the bell cranks to the knife blades 104 have retracted the knife blades to their radially innermost positions.

When the lowermost knife blade 104 (FIG. 18) approaches vertical alignment with the slot 38 (FIG. 14) in the lower gripping jaws 36, the lower cam follower roller 64 begins to ride over the cam lobe 60. The lower cam follower roller 64, accordingly, swings the pivot arm 66 about the pivot pin 68 to move the lower tension rod 80 to the right, (FIG. 18). The lower tension links 84 are thus moved toward the open end of the bore 74 of the upper crimping head shaft 30, and the lower pair of the bell crank lines 88 swing downward about their respective pivot pins 96. After an initial angular motion through the angle "a" of about 11° and 30 minutes (see FIG.. 5) the blade will have been projected downwardly to about its mid or center position as indicated by the reference line x - x as indicated in FIG. 5. The bell crank to blade pivots 102 now pass "over center" and swing through the second angle "a" to fully project the lower knife blade 104 into the recess 38 in the lower gripping jaw 36, as shown in FIG. 14. After the parts leave the position of FIG. 14, wherein the blade is fully projected, the cam follower roller begins to ride radially outwardly along the other side of the cam lobe 60 to the position shown in FIG. 4A. During this time, the tension spring 92 (FIG. 6) attached to the tension links 84 restores the knife blade 104 to its initial retracted position and maintains the cam follower roller in rolling engagement with the radially inwardly facing circular portion of the cam 58 until the cam follower roller again arrives at the cam lobe 60 to repeat the cutting action just described.

Meanwhile, each outward movement of the lowermost knife blade 104 through the web gripped between the gripping jaws 34 and 36 (FIG. 14) has produced, with essentially radial motion relative to the upper crimping head shaft, 30, a zig zag severance line through the web between adjacent packages. It will be recognized that the substantially radial motion of the knife blades 104 without any appreciable endwise motion (as described in connection with FIG. 5) is obtained by driving both pivotal connections 102 (FIGS. 17 and 18) to each knife blade over center. A further advantage of the present structure is that the internal driving arrangement wherein the knife blade actuating mechanism is contained within the upper gripping head shaft 30 and within the crimping jaws 34 provides unobstructed space at each end of the crimping jaws for mounting package tucking apparatus, not shown. Most horizontal wrapping machines of the type illustrated operate with auxiliary package tucking means which utilizes a rotating cam at each end of the crimper to control the motions of two tucking mechanisms which operate against the sides of the entubed articles between adjacent articles.

A further advantage of the present construction is that it minimizes the possibility of grease and oil contamination in the vicinity of the web contacting surfaces since all of the operating mechanism is internal. As mentioned, note also that the internal driving arrangement as described minimizes mechanical loadings at the pivotal connections to the knife, and the spring loading forces are not transmitted through either the blade 104 or the bell cranks 88 since these forces are borne directly by the tension links or rods 84.

The use of the continuous cam 58 provides positive control of the knife motion characteristics, and the knife penetration can be precisely set by adjusting the effective length of the tension rods 80 via the threaded adjusters 78. Since the cam follower rollers 64 are in continuous, smooth rolling engagement with the cam 58, the knife operating mechanism does not have to strike a stop at the end of its retracting motion since the retracting motion is controlled by the cam. In short, the knife actuating mechanism as disclosed can be operated at relatively high production rates, is subject to minimal wear of the various components, provides for easy operational adjustments, and operates at a relatively low noise level.

Although the best mode contemplated for carrying out the present invention has been herein shown and described, it will be apparent that modification and variation may be made without departing from what is regarded to be the subject matter of the invention.

What we claim is:

1. In an article wrapping machine of the type having a frame, superposed shafts geared together and mounting opposed rotary crimping heads for crimping the wrapping between articles, means for mounting a radially movable knife blade in a slot formed in one crimping head, a blade receiving recess formed in the other crimping head, and blade actuating mechanism for moving said blade into and out of said recess to sever the wrapping between articles; the improvement wherein said blade mounting means comprises a pair of axially spaced links pivoted to said blade carrying head at the radially inner portion of its slot, and means connecting an outer end of each of said links to said blade, the shaft mounting said blade carrying head having an axial bore, said blade actuating mechanism comprising a rod movable axially in said shaft bore, the inner end of each of said links being pivotally connected to said rod, cam follower means mounted on one end of said shaft for operating said rod and a stationary cam mounted on said frame for actuating said cam follower means, each of said links comprising a bell crank, the intermediate portion of each bell crank being pivoted to the crimping head, the outer end of each bell crank being pivoted to the blade and the inner end being pivoted to said rod, the blade pivot of each crank, when the blade is retracted, being disposed a short distance radially inwardly of an axial reference line that extends through the axis of the intermediate pivot of the bell crank, said blade pivot being disposed radially outwardly of said reference line by substantailly the same distance when said blade is fully projected.

2. The wrapping machine of claim 1, wherein motion of said blade deviates from pure radial motion by less then 1/64 inches.

3. The wrapping machine of claim 1, wherein said cam surface, said surface being substantially cylindrical but having a single radially inwardly projecting lobe for actuating said cam follower means, said cam lobe having an effective range of action of about 15° of cam-shaft rotation.

4. The wrapping machine of claim 3, comprising spring means connected directly between said rod and said shaft for causing the rod to retract the blade.

5. The wrapping machine of claim 4, wherein said spring means comprises a tension coil spring disposed in the bore in said shaft, said cam follower means pulling on said rod.

6. The wrapping machine of claim 1, wherein means are provided for adjustably connecting said rod to said cam follower means for precisely positioning said blade.

7. In an article wrapping machine of the type having a frame, superposed shafts geared together and mounting opposed rotary crimping heads for crimping the wrapping between articles, means for mounting a radially movable knife blade in a slot formed in one crimping head, a blade receiving recess formed in the other crimping head, and blade actuating mechanism for moving said blade into and out of said recess to sever the wrapping between articles; the improvement wherein each shaft mounts diametrically opposed crimping heads with both heads on one shaft carrying blades and both heads on the other shaft having recessed, said blade mounting means comprises a pair of axially spaced bell cranks pivoted to each blade carrying head at the radially inner portion of its slot, and means pivotally connecting an outer end of each of said bell cranks to the associated blade, the shaft mounting said blade carrying heads having an axial bore, said blade actuating mechanism comprising two rods movable axially in said shaft bore, the inner end of each of said bell cranks for one blade being pivotally connected to one of said rods, the corresponding bell cranks for the other blade being connected to the other rod, individual cam follower means mounted on one end of said shaft for operating one end of each rod and a stationary cam mounted on said frame for actuating both of said cam followers.

8. The wrapping machine of claim 7, comprising a tension coil spring in said shaft bore connected between the other end of each rod and the shaft, said cam followers pulling on their associated rods.

9. In an article wrapping machine of the type having a frame, superposed shafts geared together and mounting opposed rotary crimping heads for crimping and sealing the wrapping between articles, means for mounting a radially movable knife blade in a slot formed in one crimping head, a blade receiving recess formed in the other crimping head, and blade actuating mechanism for moving said blade into and out of said recess to sever the wrapping between articles; the improvement wherein said blade actuating mechanism comprises means for moving said blade radially without any substantial axial motion, the cutting edge portion of said knife blade comprising a flat plate having parallel sides with a bevel formed on one side of said plate, said bevel intersection the opposite side of the plate and teeth formed in the beveled portion of the blade, said teeth having sharpened cutting edges disposed in the plane of said bevel and extending between the sides of said plate, said teeth being relieved behind said cutting edges, said sharpened cutting edges forming a sawtooth cutting edge that zig zags between the two sides of said plate for effecting progressive cutting of the web when the blade is projected into said crimping head recess for producing a zig zag severance line across the web that has the same width as the thickness of said plate.

10. The wrapping machine of claim 9, wherein said blade teeth have a pitch in the range of about 12 teeth/inch to 16 teeth/inch.

11. The wrapping machine of claim 9, wherein the blade is mounted in the crimping head so that its bevel is on the leading side of the blade.

12. The wrapping machine of claim 9, wherein the flat plate is about 1/32 inches thick.

* * * * *

UNITED STATES PATENT OFFICE
CERTIFICATE OF CORRECTION

PATENT NO. : 3,943,686
DATED : March 16, 1976
INVENTOR(S) : DONALD C. CRAWFORD and MICHAEL R. NACK It is certified that error appears in the above-identified patent and that said Letters Patent are hereby corrected as shown below:

Column 3, line 45  change "dispersed" to --disposed--.

Column 4, line 2   delete "approximating"

Column 5, line 55  after "to" insert --a cross pin 94 that is carried by the upper crimping head--.

Column 6, line 1   after "open" insert --outer--.

Column 8, line 54  change "approximately" to --approximating--.

Column 11, line 35 after "being" add --pivotally--.

Column 10, line 64 after "cam" insert --has a radially inwardly facing--.

Signed and Sealed this

Seventh Day of September 1976

[SEAL]

Attest:

RUTH C. MASON
Attesting Officer

C. MARSHALL DANN
Commissioner of Patents and Trademarks